Inventor
HENRY T. BURKEY

United States Patent Office 2,751,881
Patented June 26, 1956

2,751,881
FISH DIVERTING MEANS
Henry Theodore Burkey, Los Angeles, Calif.
Original application December 31, 1946, Serial No. 719,553, now Patent No. 2,612,861, dated October 7, 1952. Divided and this application March 13, 1952, Serial No. 276,343

2 Claims. (Cl. 119—3)

The present invention relates to a method and an apparatus for causing fish to travel in different paths, the present application constituting a division of my copending application, Serial No. 719,533, filed December 31, 1946, now Patent No. 2,612,861, issued October 7, 1952, for Fish Diverting Means.

After the spawning season certain fish, including baby salmon, migrate downstream in the directions of large bodies of water. However, oftentimes many of these fish are sidetracked into irrigation ditches, shallow streams and the like where they may perish either when they travel downstream as babies or when they return upstream as adults.

It is a characteristic of some fish, notably baby salmon, always to travel in the direction of water flow. During the irrigation season large amounts of water are diverted into irrigation ditches and a relatively large amount of fish may travel with the resulting rapid water stream into the irrigation ditches.

It is therefore an object of the present invention to provide an improved method of and apparatus for maintaining fish in desired streams and to simultaneously prevent them from entering undesired streams, ditches, canals and the like where they may otherwise perish, such as dead-end sloughs or streams emptying into a large body of water.

A specific object of the present invention is to provide a new method and apparatus wherein a "progressive fish moving influence" is created, thereby to maintain fish in desired streams and simultaneously to prevent them from entering other undesired bodies of water.

The term "progressive fish moving influence" in this specification and appended claims is intended to mean an influence to which an instinct of a fish responds to tend to make the fish move progressively in predetermined directions with the means which causes the influence to exist.

Still another object of the present invention is to provide an artificially created stream of water at points along a stream in such a manner as to induce fish to stay in desired streams of water and to stay in desired paths by causing them to swim past those points where their paths might otherwise be diverted.

The features of the present invention which are believed to be novel are set forth with particularity in the appended claims. This invention itself, both as to its organization and manner of operation, together with further objects and advantages thereof, may best be understood by reference to the following description taken in connection with the accompanying drawings, in which:

Figure 1:
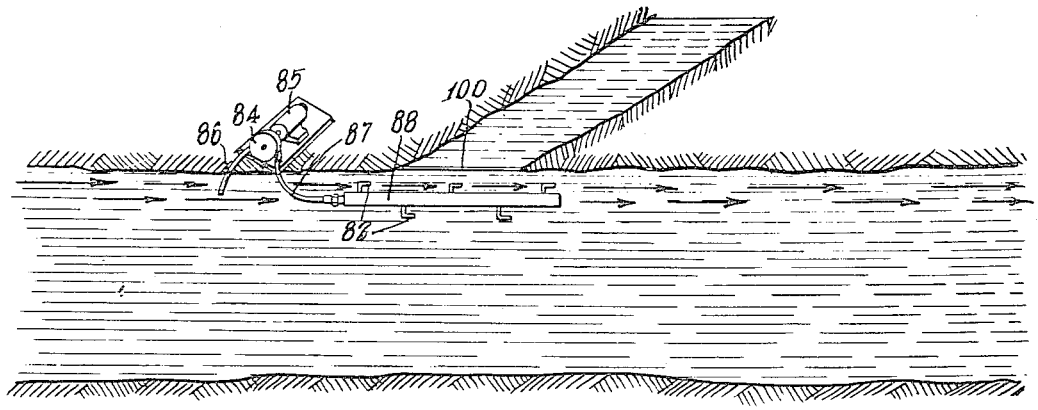
Figure 1 shows apparatus incorporating the present invention located at the junction of an irrigation ditch with a main body of water.
Figure 2:
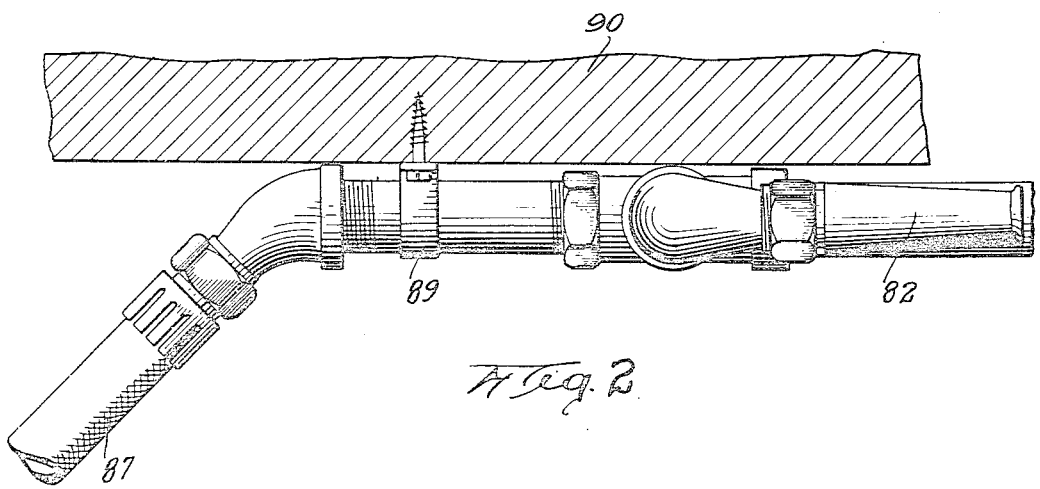
Figure 2 is an enlarged view of a portion of the apparatus shown in Figure 1.

In Figures 1 and 2, the apparatus for producing the desired effect on fish is essentially non-electric in character.

In Figures 1 and 2, the apparatus for producing the desired effect on fish serves to produce a stream of water at the junction of a main stream with an irrigation ditch by pumping water through a series of nozzles 82 directed downstream. A hydraulic pump 84 driven by an electric motor 85 has its intake 86 in communication with the stream of water and its outlet 87 connected to a distributing manifold 88 to which each one of the nozzles 82 is in communication. The manifold 88 is supported along its length by clamping members 89 to a buoyant member 90, the buoyant member being located at the entrance to the irrigation ditch and the nozzles 82 being submerged in the water of the main stream.

The nozzles 82 may take different forms and shapes and may comprise nozzles similar to those used in connection with household garden hoses.

Adult salmon may encounter the same pitfalls when returning upstream in the spawning season as they originally encountered in their downstream journey in their babyhood. The possibility of the adult salmon entering undesired streams leading to large bodies of water or dead-end sloughs is minimized by the same apparatus described herein, with the direction of the stream of water produced by the apparatus remaining unaltered.

The apparatus described herein may, or may not, be used in conjunction with a mechanical and/or an electric fish screen of the types shown in my numerous United States Letters Patent on this subject, as, for example, Patents No. 2,605,742 and No. 2,612,861. Preferably, an electric screen illustrated generally as the structure 100 is disposed in the vicinity of the entrance to the divergent stream or slough adjacent the other apparatus, in which case the undesired path of a fish is diverted by the joint action of the electric screen and the means described herein for producing a "progressive fish moving influence." In such case a fish, such as salmon, whose instinct it is to "hit" obstacles repeatedly with increased force, may after "hitting" and "bouncing" away from a mechanical screen and/or an electrified zone, produced by the fish screen 100, be guided away from the area by the progressive fish moving influence. Although the salmon may eventually determine that his "bucking" or "hitting" the barrier does not produce its intended result, the progressive fish moving influence serves to some extent to prevent salmon from congregating adjacent a fish screen through which some might possibly get and further to conserve the energy of the fish in their otherwise futile efforts.

While the particular embodiments of the present invention have been shown and described, it will be obvious to those skilled in the art that changes and modifications may be made without departing from this invention in its broader aspects and therefore the aim in the appended claims is to cover all such changes and modifications as fall within the true spirit and scope of this invention.

I claim:
1. In a system of the character described, in which fish are maintained in a first stream and diverted from a second stream, a series of nozzles, a pump having its outlet connected to said nozzles and its inlet connected to one of said streams, said nozzles being so directed as to create a stream of water flowing generally transversely to the direction of said first stream and at the junction of said first stream with said second stream.

2. In a system of the character described, in which fish are maintained in a first stream and diverted from a second stream, a float maintained at the junction of said first stream with said second stream, a series of spaced nozzles mounted on said float, pump means having its outlet in connection with said nozzles and its inlet in connection with one of said streams, said nozzles being so directed as to create an artificially moved stream of water which flows across the mouth of said first stream at the junction of said first stream with said second stream.

References Cited in the file of this patent
UNITED STATES PATENTS

| | | |
|---|---|---|
| 2,605,742 | Burkey | Aug. 5, 1952 |
| 2,612,861 | Burkey | Oct. 7, 1952 |